(12) United States Patent
Sailer et al.

(10) Patent No.: US 10,841,733 B1
(45) Date of Patent: Nov. 17, 2020

(54) DISPLAY CONTROL BASED ON LOCATION OF VEHICLE

(71) Applicant: Honda Motor Co., Ltd., Tokyo (JP)

(72) Inventors: Michael T Sailer, Whittier, CA (US); Nathan G Brown, Long Beach, CA (US); Shigenobu Saigusa, West Bloomfield, MI (US); Soroush Jalali, Ann Arbor, MI (US); Samer Rajab, Novi, MI (US); Henricus Andhy Yuliawan, Bandung (ID)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/697,701

(22) Filed: Nov. 27, 2019

(51) Int. Cl.
| | |
|---|---|
| *H04W 24/00* | (2009.01) |
| *H04W 4/021* | (2018.01) |
| *H04W 4/44* | (2018.01) |
| *G08G 1/0968* | (2006.01) |
| *G01C 21/36* | (2006.01) |
| *H04W 4/46* | (2018.01) |
| *G06F 3/0482* | (2013.01) |
| *G08G 1/14* | (2006.01) |

(52) U.S. Cl.
CPC ........ *H04W 4/021* (2013.01); *G01C 21/3685* (2013.01); *G06F 3/0482* (2013.01); *G08G 1/096866* (2013.01); *G08G 1/143* (2013.01); *H04W 4/44* (2018.02); *H04W 4/46* (2018.02)

(58) Field of Classification Search
CPC ........ H04W 4/021; H04W 4/46; H04W 4/44; G01C 21/3685; G06F 3/0482; G08G 1/096866; G08G 1/143; G08G 1/14
See application file for complete search history.

(56) References Cited

U.S. PATENT DOCUMENTS

| | | | |
|---|---|---|---|
| 7,305,114 B2 | 12/2007 | Wolff et al. | |
| 7,715,929 B2 | 5/2010 | Skourup et al. | |
| 9,918,193 B1 | 3/2018 | Nguyen et al. | |
| 2007/0124043 A1 | 5/2007 | Ayoub et al. | |
| 2011/0133959 A1 | 6/2011 | Suzuki et al. | |

(Continued)

FOREIGN PATENT DOCUMENTS

| | | |
|---|---|---|
| KR | 100789099 B1 | 12/2007 |
| KR | 101466505 B1 | 12/2014 |
| WO | 2018194417 A1 | 10/2018 |

*Primary Examiner* — Barry W Taylor
(74) *Attorney, Agent, or Firm* — American Honda Motor Co., Inc.; Aaron C. Fong

(57) ABSTRACT

A display apparatus is provided. The display apparatus includes a display screen, and control circuitry that is coupled with the display screen. The control circuitry is configured to detect at least one physical space based on a geographical location of a vehicle which includes the display apparatus. The control circuitry is configured to establish a communication connection with at least one electronic device associated with the detected at least one physical space. The control circuitry is further configured to receive at least one image frame associated with at least one activity being performed within the at least one physical space based on the established communication connection. The at least one image frame is received from the at least one electronic device. The control circuitry is further configured to control the display screen to display the received at least one image frame associated with the at least one activity.

21 Claims, 7 Drawing Sheets

(56) References Cited

U.S. PATENT DOCUMENTS

| | | | |
|---|---|---|---|
| 2011/0187865 A1* | 8/2011 | Felt | H04N 7/18 |
| | | | 348/159 |
| 2014/0046802 A1* | 2/2014 | Hosein | G06Q 30/06 |
| | | | 705/26.61 |
| 2017/0032582 A1 | 2/2017 | Moran et al. | |
| 2017/0092130 A1* | 3/2017 | Bostick | G08G 1/144 |
| 2017/0327082 A1 | 11/2017 | Kamhi et al. | |
| 2019/0072974 A1 | 3/2019 | Hwang et al. | |
| 2019/0199847 A1* | 6/2019 | Nguyen | H04M 1/72547 |
| 2019/0236953 A1* | 8/2019 | Peters | G01S 13/04 |
| 2020/0086853 A1* | 3/2020 | Kumar | H04W 4/46 |

* cited by examiner

DISPLAY CONTROL BASED ON LOCATION OF VEHICLE

BACKGROUND

Various techniques have been developed to provide information to an occupant of a vehicle (such as a driver of the vehicle) during a course of a journey. The information may include, for example, obstacle information, geographical information, traffic information, weather information, vehicle parameters information, and the like. Typically, during a course of the journey, the occupant may visit and explore several places of interest based on the provided information. However, in case of a disabled occupant, physically visiting and exploring multiple places to finalize an actual place of interest may be cumbersome and time consuming for the disabled occupant. Thus, due to certain health-related limitations and paucity of time, the disabled occupant may not be motivated enough to explore their passions and places-of-interests, and may further feel isolated. Thus, an intelligent and smart device may be required such that the disabled occupant may easily explore their places-of-interests and passion.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

In accordance with one embodiment of the disclosure, a display apparatus may be provided. The display apparatus may include a display screen. The display apparatus may further include control circuitry that may be coupled with the display screen. The control circuitry may be configured to detect at least one physical space based on a geographical location of a first vehicle which may include the display apparatus. The control circuitry may be further configured to establish a first communication connection with at least one electronic device associated with the detected at least one physical space. The control circuitry may be further configured to receive at least one image frame, associated with at least one activity being performed within the at least one physical space, based on the established first communication connection with the at least one first electronic device. The at least one image frame may be received from the at least one first electronic device. The control circuitry may be further configured to control the display screen to display the received at least one image frame associated with the at least one activity.

In accordance with other embodiment of the disclosure, a display apparatus may be provided. The display apparatus may include a display screen. The display apparatus may further include control circuitry that may be coupled with the display screen. The control circuitry may be configured to detect a plurality of physical spaces based on a geographical location of a first vehicle which may include the display apparatus. The control circuitry may be further configured to establish a first communication connection with a plurality of electronic devices associated with the detected plurality of physical spaces. The control circuitry may be further configured to receive a plurality of images frames, associated with a plurality of activities being performed within the plurality of physical spaces, based on the established first communication connection with the plurality of electronic devices. The control circuitry may be further configured to control the display screen to display at least one image frame from the received plurality of image frames based on a selection of an activity category from a plurality of activity categories associated with the plurality of activities.

In accordance with yet other embodiment of the disclosure, a method may be provided. Any display apparatus, for example, a display apparatus including a display screen, may execute operations specified in the method. The method may include detecting at least one physical space based on a geographical location of a first vehicle which includes the display apparatus. The method may further include establishing a first communication connection with at least one electronic device associated with the detected at least one physical space. The method may further include receiving at least one image frame, associated with at least one activity being performed within the at least one physical space, based on the established first communication connection with the at least one first electronic device. The at least one image frame may be received from the at least one first electronic device. The method may further include controlling the display screen to display the received at least one image frame associated with the at least one activity.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

Figure 1:
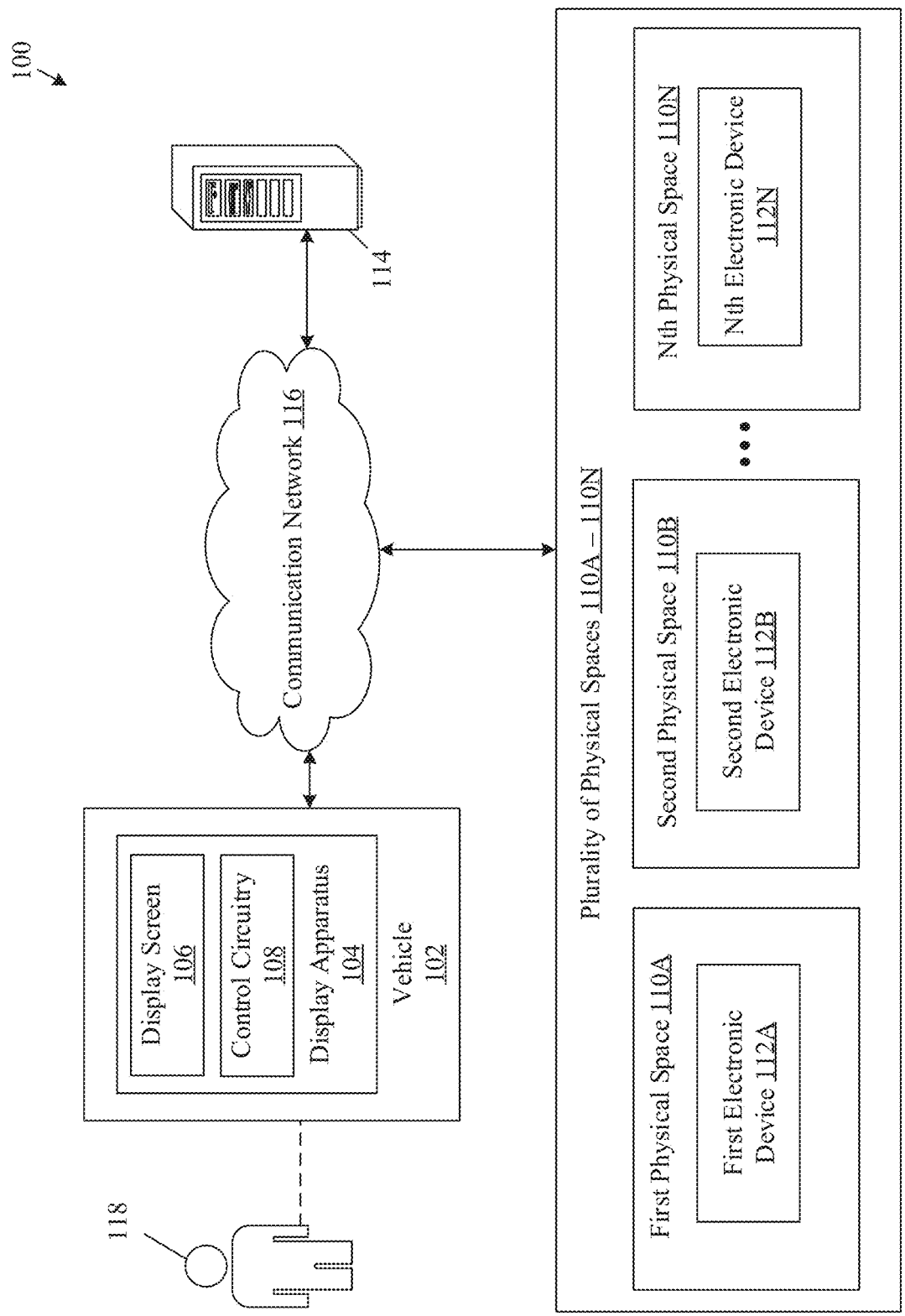
FIG. 1 is a block diagram that illustrates an exemplary environment for display control based on a location of a vehicle, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed display apparatus configured to display, to an occupant (e.g. disabled person), information of physical spaces (for example, activities within malls, parks, offices, or clubs) situated or present in surroundings of a vehicle. Exemplary aspects of the disclosure may provide a display apparatus that may detect one or more physical spaces (such as offices, theaters, stadiums, party venues, or like) based on a geographical location (for example current location) of the vehicle. The one or more physical spaces may be situated nearby or within a certain distance from the geographical location of the vehicle. The vehicle may include an occupant (for example a disabled person). The disclosed display apparatus may further receive information (for example live images) about activities (for example meetings, musical activity, sport activity, art activity, and like) being performed within the detected one or more physical spaces. The display apparatus may further include a display screen that may display the information of the activities being performed within the detected physical spaces to the occupant of the vehicle. The display apparatus may further receive an input from the occupant (for example disabled person) to select a particular activity from the displayed ongoing activities close to the vehicle. Based on the selection of the particular activity, by the occupant, the display apparatus may further provide additional information (for example, but not limited to, images of the selected activity, route information to reach destination of the selected activity, currently available parking zone at the destination, or available people at the destination) to the occupant. Thus, the disclosed display apparatus may provide real-time information or assistance to the occupant (especially the disabled person) of the vehicle such that the occupant may explore all the ongoing activities happening in the nearby physical spaces on the display screen, and may further select a final activity-of-interest to visit personally, without physically visiting different activities one-by-one.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 illustrates an exemplary environment for display control based on a location of a vehicle, in accordance with an embodiment of the disclosure. With reference to FIG. 1, there is shown an exemplary network environment 100. In the network environment 100, there is shown a vehicle (such as a first vehicle 102). The first vehicle 102 may include a display apparatus 104. The display apparatus 104 may include a display screen 106 and control circuitry 108. The control circuitry 108 may be communicatively coupled to the display screen 106. In the network environment 100, there is further shown a plurality of physical spaces 110A to 110N that may include a plurality of electronic devices 112A to 112N. Each of the plurality of physical spaces 110A to 110N may be associated with at least one electronic device. In FIG. 1, there is further shown a server 114 and a communication network 116. The display apparatus 104, the plurality of electronic devices 112A to 112N, and the server 114 may communicate with each other through the communication network 116. In FIG. 1, there is further shown an occupant (such as a first occupant 118) that may be associated with the first vehicle 102. In some embodiments, the first occupant 118 may be a driver of the first vehicle 102. In other embodiments, the first occupant 118 may be a passenger of the first vehicle 102 to whom content may be displayed on the display apparatus 104.

In accordance with an embodiment, each of the plurality of physical spaces 110A to 110N may be a physical area bounded by walls and/or a roof. Each of the plurality of physical spaces 110A to 110N may be an indoor space or an outdoor space. Examples of each of the plurality of physical spaces 110A to 110N may include, but are not limited to, an office building, a conference room, a meeting room, an auditorium, a school, a mall, an entertainment park, a restaurant, a college, a sports ground, a movie/music theater, a clubhouse, or an event area.

The first vehicle 102 may be a non-autonomous vehicle, a semi-autonomous vehicle, or a fully autonomous vehicle, for example, as defined by National Highway Traffic Safety Administration (NHTSA). Examples of the first vehicle 102 may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. Examples of the four-wheeler vehicle may include, but are not limited to, an electric car, an internal combustion engine (ICE)-based car, a fuel-cell based car, a solar powered-car, or a hybrid car. In some cases, the first vehicle 102 may be a wheelchair that may be equipped with the display apparatus 104 and other components. The present disclosure may be also applicable to other types vehicles (such as two-wheelers). The description of other types of the first vehicle 102 has been omitted from the disclosure for the sake of brevity.

The display apparatus 104 may include suitable logic, circuitry, interfaces and/or code that may be configured to present at least audio-based data, image-based data, and/or video-based data to the first occupant 118. The display apparatus 104 may be configured to execute one or more operations based on user inputs provided by the first occupant 118 of the first vehicle 102. The display apparatus 104 may be configured to detect at least one physical space (such as one of the plurality of physical spaces 110A to 110N) based on a geographical location (i.e. current GPS location) of the first vehicle 102. The display apparatus 104 may be further configured to establish a first communication connection with at least one electronic device (such as the first electronic device 112A) associated with the detected at least one physical space. The display apparatus 104 may be further configured to receive at least one image frame from the at least one electronic device based on the established first communication connection. The received one image frame may be associated with at least one activity being performed within the at least one physical space. The display apparatus 104 may be further configured to control the display screen 106 to display the received image frame associated with the activity. The display apparatus 104 may be further configured to control the display screen 106 to display route information which may indicate a route between the geographical location of the first vehicle and a geographical location of the at least one physical space. The display apparatus 104 may be further configured to control the display screen 106 to display parking information, associated with the at least one physical space, to the first occupant 118. Examples of the display apparatus 104 may include, but are not limited to, a multi-information display (MID) panel, a digital instrument cluster, an automotive HUD, an automotive dashboard, a consumer-electronic (CE) device, in-vehicle infotainment apparatus, a navigation apparatus, a vehicle user-interface (UI) apparatus, an Internet-enabled communication apparatus, or an electronic device with display capability.

The display screen 106 may include suitable logic, circuitry, and interfaces that may be configured to display various information (such as navigation information, media information, weather information, activity information, parking information, and/or vehicle parameters) to the first occupant 118. The display screen 106 may be a touch screen, which may enable the occupant of the first vehicle 102 to provide the user inputs via the display screen 106. The touch screen may be at least one of a resistive touch screen, a capacitive touch screen, or a thermal touch screen. The display screen 106 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 106 may refer to a display screen of a head mounted device (HMD), a smart-glass device, a see-through display, a projection-based display, an electro-chromic display, or a transparent display. In one embodiment, the display screen 106 may be one of a Multi-Information Display (MID), an automotive Head-Up Display (HUD), or an instrument cluster.

The control circuitry 108 may include suitable logic, circuitry, and interfaces that may be configured to execute program instructions associated with different operations to be executed by the display apparatus 104. For example, some of the operations may include, but are not limited to, detection of the plurality of physical spaces 110A to 110N close to the first vehicle 102, establishment of the first communication connection, reception of images associated with the activities being performed within the plurality of physical spaces 110A to 110N, control of the display screen 106 to display the received images, reception of the parking information, communication with other vehicles (such as second vehicle) or reception of user inputs from the first occupant 118. The control circuitry 108 may include one or more specialized processing units, which may be implemented as a separate processor. In an embodiment, the one or more specialized processing units may be implemented as an integrated processor or a cluster of processors that perform the functions of the one or more specialized processing units, collectively. The control circuitry 108 may be implemented based on a number of processor technologies known in the art. Examples of implementations of the control circuitry 108 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

Each of the plurality of electronic devices 112A to 112N may include suitable logic, circuitry, interfaces, and/or code that may be configured to capture or store information (for example image/audio frames) of a plurality of activities being performed within each of the plurality of physical spaces 110A to 110N in real-time or in near real-time basis. Examples of the plurality of activities may include, but are not limited to, a meeting, a musical event, a dance event, a training, a talk show, a sports event, a comedy show, a trade fair, a painting show, an art event, a seminar, a movie, and the like. Each of the plurality of electronic devices 112A to 112N may comprise an image capturing apparatus, an audio capturing device, or an audio-video capturing device that may capture image frames or audio frames associated with the plurality of activities being performed within each of the plurality of physical spaces 110A to 110N. Each of the plurality of electronic devices 112A to 112N may be configured to store the captured image or audio frames. Further, each of the plurality of electronic devices 112A to 112N may be further configured to communicate with the display apparatus 104 and the server 114, via the communication network 116, to exchange information (such as the captured image/audio frames of the activity). Examples of each of the plurality of electronic device 112A to 112N may include, but are not limited to, a wide-angle camera, an action camera, a camcorder, a digital camera, a night-vision camera, Closed Circuit Television (CCTV) camera, a 360-degree camera, an image sensor, a computing device, a server, or other image capturing apparatus.

In some embodiments, each of the plurality of electronic devices 112A to 112N may include a second electronic device that may include an audio capturing device which may capture the audio frames associated with a particular activity. Examples of the audio capturing device may include, but are not limited to, a recorder, an a dynamic microphone, a carbon microphone, a piezoelectric microphone, a fiber microphone, a (micro-electro-mechanical-systems) MEMS microphone, or other microphones configured to communicate with external devices (such as the display apparatus 104). In certain embodiments, each of the plurality of electronic devices 112A to 112N may include an integrated unit that may include the image capturing apparatus and the audio capturing device in a single unit. Each of the plurality of electronic devices 112A to 112N may be installed or located at a particular place (for example, but not limited to, ceiling, roof, or walls) of the corresponding physical space to capture the image or audio frames of the corresponding activity being performed.

The server 114 may include suitable logic, circuitry, interfaces, and/or code that may be configured to store information of the first vehicle 102, for example, but not limited to, vehicle identification information, geographical location of the first vehicle 102, or registered owner information. The server 114 may store information of each of the plurality of physical spaces 110A to 110N (such as geolocation information of the plurality of physical spaces 110A to 110N, parking information of each of the plurality of physical spaces 110A to 110N, a type of a physical space, a category of an activity being performed in each of the plurality of physical spaces 110A to 110N, and the like). In some embodiments, the server 114 may be further configured to receive and store the captured information (i.e. image or audio frames) of the plurality of activities being performed within the plurality of physical spaces 110A to 110N. The server 114 may receive the captured information from the plurality of electronic devices 112A to 112N located within the plurality of physical spaces 110A to 110N. The server 114 may be further configured to transmit the captured information of the plurality of activities to the display apparatus 104, via the communication network 116, based on a request received from the display apparatus 104. In some embodiments, the server 114 may be implemented as a cloud server, which may be utilized to execute various operations through web applications, cloud applications, HTTP requests, repository operations, file transfer, gaming operations, and the like. Examples of the server 114 may include, but are not limited to, a cloud server, a web server, a database server, a file server, an application server, a mainframe server, or a combination thereof.

The communication network 116 may include a communication medium through which the display apparatus 104, each of the plurality of electronic devices 112A to 112N, and the server 114 may communicate with each other. The communication network 116 may be a wired or wireless connection. Examples of the communication network 116 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 116 in accordance with various wireless communication protocols. Examples of such wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the display apparatus 104 may be configured to receive a request from the first occupant 118 to provide information about activities or events being currently performed or scheduled in nearby locations or physical places. The first occupant 118 may be a disabled person who may be a driver or passenger of the first vehicle 102. Based on the received request, the display apparatus 104 may be configured to detect at least one physical space (for example, a first physical space 110A of the plurality of physical spaces 110A to 110N) based on a geographical location (i.e. current location) of the first vehicle 102. The at least one physical space may be situated near (or within predefined distance) to the geographical location of the first vehicle 102. The at least one physical space may be a physical area where one or more activities or event being performed or scheduled (say in certain duration, like in next couple of hours). The details of the detection of at least one physical space based on the geographical location (i.e. current location) of the first vehicle 102 is described, for example, in FIG. 3.

The display apparatus 104 may be further configured to establish a first communication connection with at least one electronic device (for example, a first electronic device 112A from the plurality of electronic devices 112A to 112N) associated with the detected physical space (for example the first physical space 110A). The display apparatus 104 may further configured to receive the information (for example, at least one image frame and/or audio frames) about the activity being performed at the detected physical space, from the at least one electronic device based on the established first communication connection. The details of the activity and the received information is described, for example, in FIGS. 3 and 4A. The display apparatus 104 may be further configured to control the display screen 106 to render the received information (for example at least one image frame and/or audio frames) associated with the activity being performed on the detected physical space. Based on the rendered information (about the nearby activity) on the display screen 106, the first occupant 118 (i.e. disabled person) may decide whether the activity (or event) is an activity-of-interest for the first occupant 118, rather than physically visiting the detected physical space. The display apparatus 104 may be further configured to receive user-selection from the first occupant 118 (i.e. disabled person) for the displayed information about the activity and may further provide route information and parking information to reach the detected physical space based on the selection. The details of the user-selection and reception of the route/parking information is described, for example, in FIGS. 3, 4A-4B, and 5.

In some embodiments, the display apparatus 104 may detect the plurality of physical spaces 110A to 110N based on the geographical location of the first vehicle 102 and may receive the information (for example, the plurality of image or video frames) of the plurality of activities, from the plurality of electronic devices 112A to 112N. The plurality of electronic devices 112A to 112N (for example the image capturing apparatuses 306A-306D shown in FIG. 3) may be located or associated with the plurality of physical spaces 110A to 110N and may capture the information (for example, the plurality of image or video frames) about the plurality of activities being performed at the corresponding physical space. The display apparatus 104 may be further configured to control the display screen 106 to render the received information about the plurality of activities as described, for example, in FIG. 4A. The display apparatus 104 may further receive a user-input from the first occupant 118 (i.e. disabled person) to select a particular activity from the displayed information about the plurality of activities. The display apparatus 104 may further provide the route information and the parking information to the first occupant 118 to reach the physical space (for example the first physical space 110A) wherein the selected activity is being performed or scheduled. Thus, the disclosed display apparatus 104 may provide real-time information or assistance to the first occupant 118 (i.e. disabled person) to receive the information about nearby activities, so that the first occupant 118 may easily decide the activity-of-interest from the first vehicle 102, without manually visiting different activities one-by-one. Further, the received route/parking information for the selected activity may provide real-time assistance to the first occupant 118 to easily reach the corresponding physical space (i.e. venue) for the selected activity.

Figure 2:
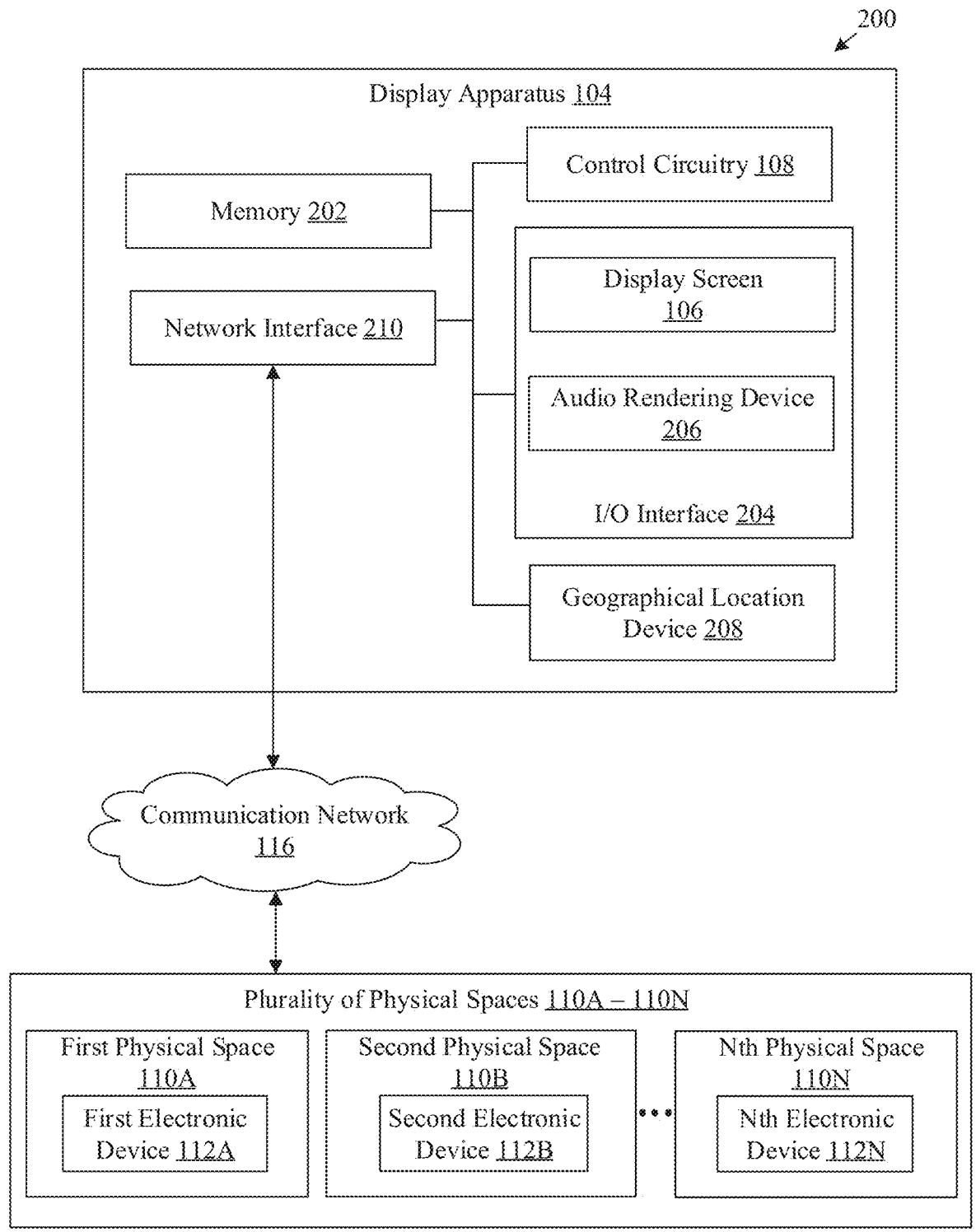
FIG. 2 illustrates a block diagram of an exemplary display apparatus for display control based on a location of a vehicle, in accordance with an embodiment of the disclosure.

FIG. 2 illustrates a block diagram of an exemplary display apparatus for display control based on a location of a vehicle, in accordance with an embodiment of the disclosure. FIG. 2 is explained in conjunction with elements from FIG. 1. With reference to FIG. 2, there is shown the display apparatus 104. The display apparatus 104 may include the control circuitry 108, a memory 202, and an input/output (I/O) device 204. The I/O device 204 may include the display screen 106 and an audio rendering device 206. The display apparatus 104 may further include a geographical location device 208 and a network interface 210 connected to the communication network 116 which may be further connected to each of the plurality of electronic devices 112A to 112N associated within each of the plurality of physical spaces 110A to 110N, as shown in FIG. 2. As further shown in FIG. 2, the control circuitry 108 may be connected to memory 202, the I/O device 204, and the network interface 210 through wired or wireless connections. The description of the display screen 106 and the control circuitry 108 is provided, for example, in FIG. 1, and therefore, avoided in FIG. 2, for the sake of brevity.

The memory 202 may include suitable logic, circuitry, interfaces, and/or code that may store a set of instructions executable by the control circuitry 108. The memory 202 may be configured to store the captured information of the plurality of activities being performed or scheduled at the plurality of physical spaces 110A to 110N. The memory 202 may be configured to store information of the first vehicle 102. Further, the memory 202 may be configured to store predefined media content to be rendered on the display screen 106, where the predefined media content may be associated with the plurality of activities. In accordance with an embodiment, the memory 202 may be configured to store information of the first occupant 118 (i.e. a driver or passenger) of the first vehicle 102. The information of the first occupant 118 may include, but not limited to, a name, an age, a gender, and/or a body type such as a disabled person or an able-bodied person, activity preferences, or past visited activities. The memory 202 may be further configured to store predefined message (i.e. message information) that may be transmitted to an electronic control device associated with a second vehicle (shown in FIG. 5). The memory 202 may be a persistent storage medium, a non-persistent storage medium, or a combination thereof. Examples of implementation of the memory 202 may include, but are not limited to, Random Access Memory (RAM), Read Only Memory (ROM), Electrically Erasable Programmable Read-Only Memory (EEPROM), Hard Disk Drive (HDD), Solid State Drive (SSD), flash memory, cache memory, and/or a Secure Digital (SD) card.

The I/O device 204 may include suitable logic, circuitry, interfaces, and/or code that may be configured to receive user inputs and provide outputs based on the received user inputs. The I/O device 204 which may include various input and output devices, may be configured to communicate with the control circuitry 108. In accordance with an embodiment, the I/O device 204 may be configured to render the predefined media content and/or the received information about the plurality of activities, via the display screen 106. The I/O device 204 may be configured to receive user-inputs from the first occupant 118 to select a particular activity or a category of the activity from the rendered information about the plurality of activities. Examples of the I/O device 204 may include, but are not limited to, a touch screen, a keyboard, a mouse, a joystick, a microphone, the display screen 106, and the audio rendering device 206.

The audio rendering device 206 may include suitable logic, circuitry, and interfaces that may be configured to playback an audio output (for example, audio frames associated with at least one of the plurality of activities). The audio rendering device 206, coupled with the control circuitry 108, may be configured to receive electrical audio signals from the control circuitry 108 based on the audio frames received from a second electronic device (i.e. audio capturing device shown in FIG. 3) which may be associated with the detected physical space (such as the first physical space 110A). The audio rendering device 206 may further convert the received electrical audio signals into the audio/sound output to be rendered. In some embodiments, the audio rendering device 206 may be integrated with the display apparatus 104 and may be an internal component of the display apparatus 104. Examples of the audio rendering device 206 may include, but are not limited to, a loudspeaker, a woofer, a sub-woofer, a tweeter, a wireless speaker, a monitor speaker, or sound output device.

The geographical location device 208 may include suitable logic, circuitry, and/or interfaces that may be configured to determine the geographical location (i.e. current location) of the first vehicle 102. The geographical location device 208 may be further configured to track the geographical location of the first vehicle 102 during a course of journey. Examples of the geographical location device 208, may include, but are not limited to, a Global Navigation Satellite System (GNSS)-based sensor of the first vehicle 102. Examples of the GNSS-based sensor may include, but are not limited to, global positioning sensor (GPS), Global Navigation Satellite System (GLONASS), or other regional navigation systems or sensors. In some embodiments, the geographical location device 208 may be an external device and may be communicatively coupled to the display apparatus 104, via an in-vehicle network of the first vehicle 102.

The network interface 210 may include suitable logic, circuitry, and interfaces that may be configured to facilitate communication between the control circuitry 108, the plurality of electronic device 112A to 112N, the server 114, and a plurality of vehicles (shown in FIG. 5) other than the first vehicle 102, via the communication network 116. The network interface 210 may be implemented by use of various known technologies to support wired or wireless communication of the display apparatus 104 with the communication network 116. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Vehicle to Everything (V2X) communication, Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS). The V2X communication may be utilized to transmit/receive information to/from any entity (such as the plurality of electronic devices 112A to 112N). The V2X communication (for example the vehicle-to-everything) may include a plurality of types of communications, such as Vehicle to infrastructure (V2I) communication, Vehicle to Network (V2N) communication, Vehicle to Vehicle (V2V) communication, Vehicle to pedestrian (V2P) communication, Vehicle to Device (V2D) communication, and/or Vehicle to Grid (V2G) communication.

Figure 3:
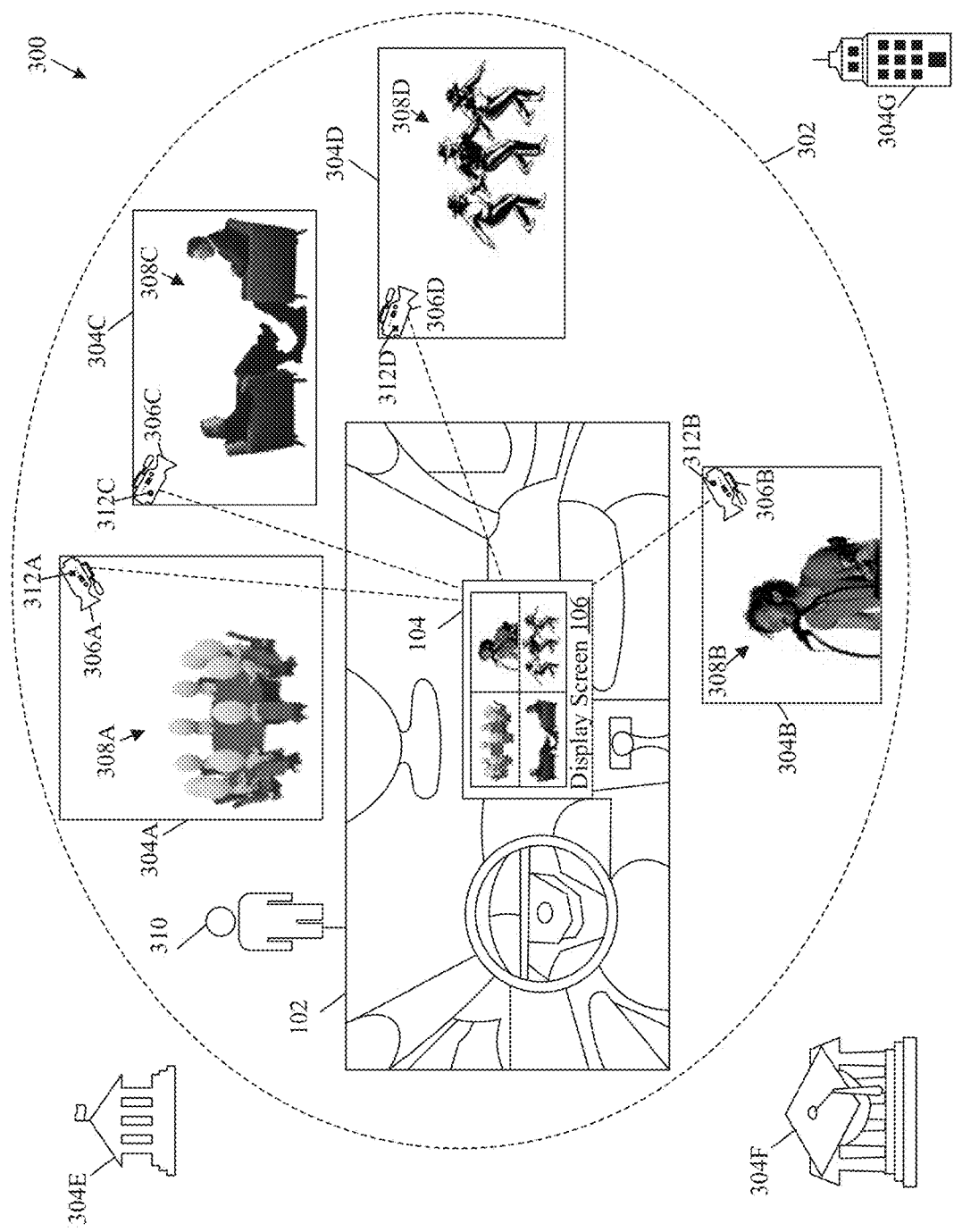
FIG. 3 illustrates an exemplary scenario for display control based on the location of the vehicle, in accordance with an embodiment of the disclosure.

FIG. 3 illustrates an exemplary scenario for display control based on the location of the vehicle, in accordance with an embodiment of the disclosure. FIG. 3 is explained in conjunction with FIGS. 1 and 2. With reference to FIG. 3, there is shown a scenario 300 that may include a vehicle (such as the first vehicle 102). The first vehicle 102 may include a display apparatus (such as the display apparatus 104) which may further include a display screen (such as the display screen 106) as shown in FIG. 3. There is further shown a plurality of physical spaces (such as the plurality of physical spaces 304A to 304G). The plurality of physical spaces 304A to 304G may be similar to the plurality of physical spaces 110A to 110N shown in FIG. 1. As shown in FIG. 3, a first set of physical spaces 304A to 304D of the plurality of physical spaces 304A to 304G may be situated or present within a specific area range 302 from a geographical location (i.e. current location) of the first vehicle 102. The specific area range 302 may be within a specific distance (for example in meters, kilometers, or miles) from the current location of the first vehicle 102. As shown in FIG. 3, a second set of physical spaces 304E to 304G of the plurality of physical spaces 304A to 304G may be situated outside the specific area range 302. Examples of each of the plurality of physical spaces 304A to 304G may include, but are not limited to, an office building, a conference room, a meeting room, an auditorium, a school, a mall, an entertainment park, a restaurant, a college, a sports ground, a movie/music theater, a clubhouse, or an event area. In an embodiment, the plurality of physical spaces 304A to 304G may be a physical area where an activity or event may be performed or scheduled to be performed (say in certain minutes or hours) by one or more people. Examples of an activity may include, but are not limited to, a meeting, a musical event, a dance event, a training, a talk show, a sports event, a comedy show, a trade fair, a painting show, an art event, a seminar, a movie, and the like. It should be noted that number of the plurality of physical spaces 304A to 304G shown in FIG. 3 are presented merely as an example. The scenario 300 may include only one physical space or more than the number of the plurality of physical spaces 304A to 304G near the first vehicle 102, without deviation from the scope of the disclosure.

In FIG. 3, there is further shown that each of the first set of physical spaces 304A to 304D may include a corresponding electronic device from a first set of electronic devices 306A to 306D. The first set of electronic devices 306A to 306D may correspond to the plurality of electronic devices 112A to 112N (shown in FIG. 1). In FIG. 3, there is further shown a plurality of activities 308A to 308D being performed within a corresponding physical space of the first set of physical spaces 304A to 304D. For example, as shown in FIG. 3, a first activity 308A, as a meeting, is being performed in a first physical space 304A, a second activity 308B, as a musical event, is being performed in a second physical space 304B, a third activity 308C, as a talk show, is being performed in a third physical space 304C, and a fourth activity 308D, as a dance event, is being performed in a fourth physical space 304D. In some embodiments, one or more of the plurality of activities 308A to 308D may be scheduled to be performed at the corresponding physical space in next certain (for example in next couple of hours). The schedule of each activity of the plurality of activities 308A to 308D may be stored in the server 114 or the memory 202 of the display apparatus 104.

In accordance with an embodiment, an occupant (for example a first occupant 310 (shown in FIG. 3) may be present in the first vehicle 102, who may be interested to know about the activities being performed or scheduled in nearby plurality of physical spaces 304A to 304G. For example, the first occupant 310 may be disabled person (or a handicapped person) for whom physically visiting different physical spaces may be difficult even if using the first vehicle 102. The first occupant 310 may a driver or a passenger of the first vehicle 102. In accordance with an embodiment, the control circuitry 108 may be configured to receive a request from the first occupant 310, via the I/O device 204 to provide information about the plurality of activities 308A to 308D currently being performed or scheduled at nearby physical spaces (for example the first set of physical spaces 304A to 304D). The first occupant 310 may provide the request to the display apparatus 104 at a time of start of a journey or during a journey to a particular destination point, via the first vehicle 102.

The control circuitry 108 may be further configured control the geographical location device 208 (i.e. for example GPS tracker) to provide a geographical location signal of the first vehicle 102 based on the request received from the first occupant 310. In some embodiments, the control circuitry 108 may detect an engine ON state of the first vehicle 102 which may be associated with the first occupant 310 (as disabled person) and further control the geographical location device 208 based on the detected engine ON state. The control circuitry 108 may be further configured to determine the geographical location (i.e. current location) of the first vehicle 102 based on the geographical location signal acquired from the geographical location device 208.

In accordance with an embodiment, the control circuitry 108 may be further configured to detect the first set of physical spaces 304A to 304D based on the determined geographical location of the first vehicle 102. More specifically, the control circuitry 108 may be configured to determine the first set of physical spaces 304A to 304D present within the specific area range 302 (or within a specific distance) from the first vehicle 102 based on the determined geographical location of the first vehicle 102. The specific distance may be a predefined distance (for example in certain meters (m), Kilometers (Km), or miles) stored in the memory 202. In some embodiments, the specific distance may be included in the request received from the first occupant 310, where the first occupant 310 may be interested to know nearby activities or physical spaces within the particular distance (say within 1 Kilometer) from the current geographical location of the first vehicle 102. In some other embodiments, the control circuitry 108 may receive information about particular place (for example, but not limited to, a city, a town, or a state) in the request, within which the first set of physical spaces 304A to 304D have to be detected. For example, the first occupant 310 may be interested to know the plurality of physical spaces 304A to 304G within a current city where the first vehicle 102 may be located.

In some embodiments, the control circuitry 108 may be configured to receive an updated map data from the server 114 based on the current geographical location of the first vehicle 102, where the updated map data may indicate geographical location information (for example GFS coordinates or address) of each of the plurality of physical spaces 304A to 304G. The control circuitry 108 may detect the first set of physical spaces 304A to 304D from the plurality of physical spaces 304A to 304G based on the received map data from the server 114 and the current geographical location of the first vehicle 102. The plurality of physical spaces 304A to 304G which have GPS coordinates or address information within the specific area range 302 may be detected as the first set of physical spaces 304A to 304D close to the first vehicle 102 as shown in FIG. 3. In some embodiments, the control circuitry 108 may transmit the current geographical location of the first vehicle 102 to the server 114 and receive information about the detected first set of physical spaces 304A to 304D (close or within certain distance from the first vehicle 102) from the server 114. In some embodiments, the control circuitry 108 may receive information about the first set of physical spaces 304A to 304D in which the plurality of activities 308A to 308D are being performed or being scheduled in next certain duration (say within same day or next day). The information about the schedule of the plurality of activities 308A to 308D (currently or scheduled to be performed) and the corresponding physical space may be stored in the server 114.

In accordance with an embodiment, the control circuitry 108 of the display apparatus 104 may be further configured to establish a communication connection (as a first communication connection) with each of the first set of electronic devices 306A to 306D within the corresponding physical space of the detected first set of physical spaces 304A to 304D near to the first vehicle 102. The control circuitry 108 may establish the communication connection with each of the first set of electronic devices 306A to 306D, via the communication network 116 and the network interface 210 (shown in FIG. 2). In some embodiments, the control circuitry 108 may establish a dedicated communication session with each of the first set of electronic devices 306A to 306D located inside (or associated with) the corresponding physical space of the first set of physical spaces 304A to 304D.

As shown in FIG. 3, for example, each of the first set of electronic devices 306A to 306D may be image capturing apparatus which may capture the corresponding plurality of activities 308A to 308D being performed within the first set of physical spaces 304A to 304D. For example, as shown in FIG. 3, a first electronic device 306A (for example a camera) may capture image frames of the first activity 308A (i.e. meeting) being performed within the first physical space 304A, a second electronic device 306B may capture image frames of the second activity 308B (i.e. musical event) being performed within the second physical space 304B, a third electronic device 306C (for example a camera) may capture image frames of the third activity 308C (i.e. talk show) being performed within the third physical space 304C, and a fourth electronic device 306D may capture image frames of the fourth activity 308D (i.e. dance event) being performed within the fourth physical space 304D.

In accordance with the establishment of the communication connection (i.e. first communication connection) with each of the first set of electronic devices 306A to 306D, the control circuitry 108 may be further configured to receive information of the set of activities 308A to 308D from the first set of electronic devices 306A to 306D. The information of each of the plurality of activities 308A to 308D may include a plurality of image frames (or video) that may represent (or associated with) the plurality of activities 308A to 308D being or currently performed within the first set of the physical spaces 304A to 304D. Each of the first set of electronic devices 306A to 306D (for example camera) may capture the plurality of image frames of the corresponding activity (i.e. the plurality of activities 308A to 308D). In some embodiments, each of the first set of electronic devices 306A to 306D may be a server which may store the plurality of images captured by another image capturing apparatus (not shown) located within the first set of physical spaces 304A to 304D close to the first vehicle 102.

In accordance with an embodiment, the first set of electronic devices 306A to 306D may be associated or coupled with a second set of electronic devices 312A to 312D. Each of the second set of electronic devices 312A to 312D may correspond to an audio capturing device (for example microphone) which may capture a plurality of audio frames (or sound frames) which may be captured from the corresponding activity of the plurality of activities 308A to 308D. In an embodiment, each of the second set of electronic devices 312A to 312D may be mounted or in-built in the corresponding electronic device of the first set of electronic devices 306A to 306D as shown in FIG. 3. The combination of the plurality of image frames and the plurality of audio frames captured over a time period may correspond to audio-video (or multimedia) content that may represent a particular activity (i.e. one of the plurality of activities 308A to 308D) being performed within the corresponding first set of physical spaces 304A to 304D.

In accordance with an embodiment, the control circuitry 108 of the display apparatus 104 may be further configured receive the information captured (or stored) by the first set of electronic devices 306A to 306D (or the second set of electronic devices 312A to 312D) based on the established communication connection with each of the first set of electronic devices 306A to 306D. The information may include the plurality of image frames or the audio frames which represented different activities (i.e. plurality of activities 308A to 308D) being performed within the first set of physical spaces 304A to 304D located close to the first vehicle 102. Further, the control circuitry 108 may be configured to control the display screen 106 to display the plurality of image frames associated with each of the plurality of activities 308A to 308D as shown in FIG. 3. The display apparatus 104 may control the display screen 106 to divide a display portion of the display screen 106 into multiple portions such that each portion may display the plurality of image frames of one activity. For example, as shown in FIG. 3, the display portion of the display screen 106 is divided into four portions to display the plurality of image frames of the plurality of activities 308A to 308D (i.e. four activities). Thus, the first occupant 310 (for example disabled driver) of the first vehicle 102 may be able to view, via the display screen 106, the plurality of activities 308A to 308D performed within the first set of physical spaces 304A to 304D while sitting or driving inside the first vehicle 102. Further, in a case, when the first vehicle 102 moves or changes its position from the determined geographical location to another geographical location, the control circuitry 108 may further detect the updated geographical location of the first vehicle 102, detect the physical spaces within the specific area range 302 from the first vehicle 102 and display the information of the activities being performed in the detected physical spaces.

Accordingly, the disclosed display apparatus 104 facilitates the first occupant 310 of the first vehicle 102 to easily find and explore activities (i.e. performed within the specific area range 302) for which the first occupant 310 may be passionate. Hence, the first occupant 310 (for example disabled person) of the first vehicle 102 can explore or select nearby live activities without physically going to each of the first set of physical spaces 304A to 304D where the activities are being performed. The control circuitry 108 may be further configured to execute a plurality of operations based on the received information related to the plurality of activities 308A to 308D or the first set of physical spaces 304A to 304D. Details of such operations may be described further, for example, in FIGS. 4A, 4B, and 5.

Figure 4A:
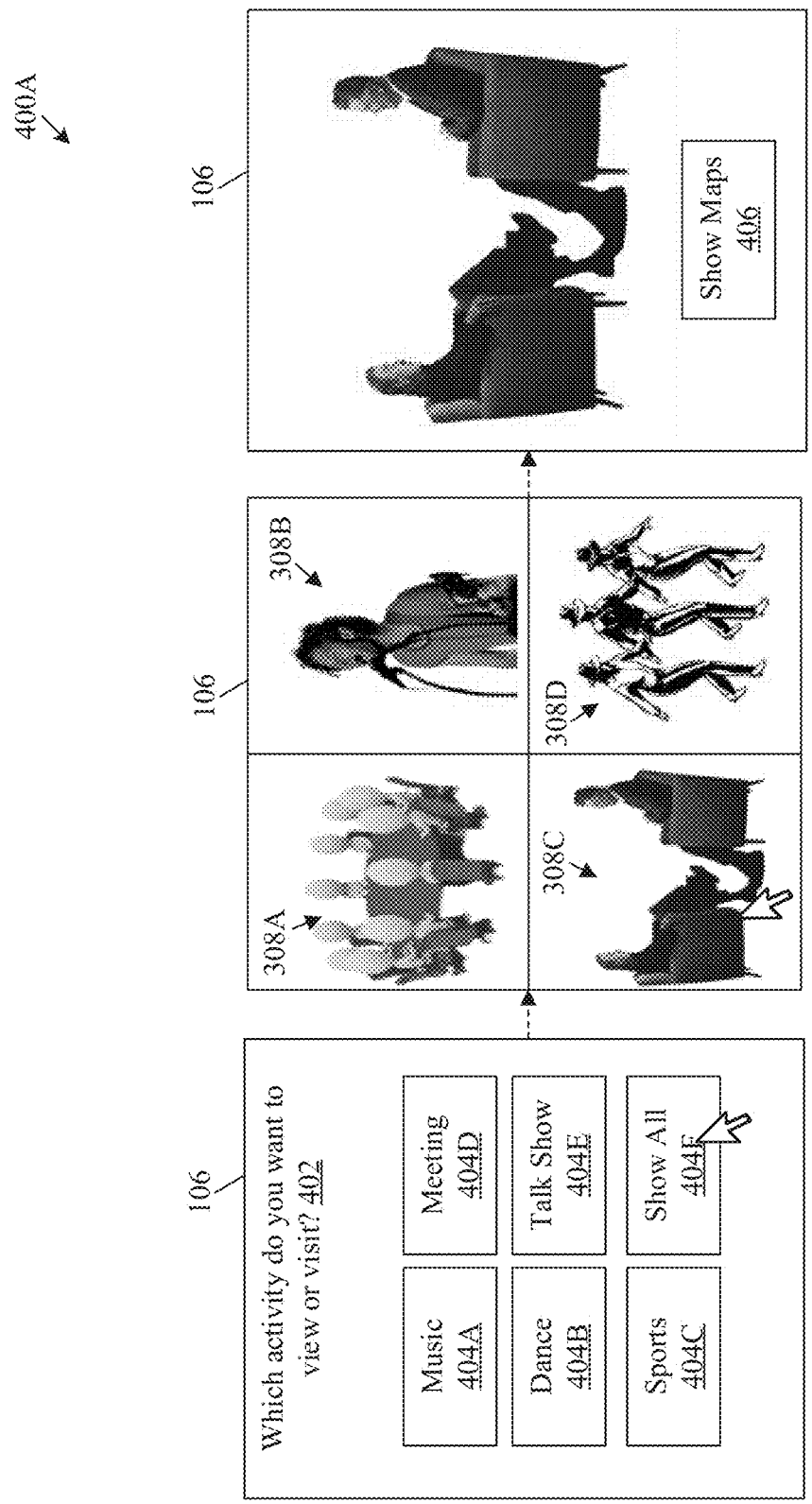
FIG. 4A illustrates an exemplary workflow for display control based on the location of the vehicle and user inputs, in accordance with an embodiment of the disclosure.

FIG. 4A illustrates an exemplary workflow for display control based on the location of the vehicle and user inputs, in accordance with an embodiment of the disclosure. FIG. 4 is explained in conjunction with FIGS. 1, 2, and 3. With reference to FIG. 4A, there is shown a scenario 400A that includes a display screen (such as the display screen 106 of the display apparatus 104).

In accordance with an embodiment, as described in FIG. 3, the control circuitry 108 may be configured to receive the information (i.e. the plurality of image frames) of the plurality of activities 308A to 308D from the first set of electronic devices 306A to 306D. In some embodiments, the information about the plurality of activities 308A to 308D may further include identification information (ID) of each of the plurality of activities 308A to 308D. The identification information (ID) of the corresponding activity may indicate a category of the corresponding activity. Examples of the category of an activity may include, but are not limited to, a music category, a seminar category, a sport category, a training category, a painting category, a talk show category, a dance category, or a meeting category. Further, the control circuitry 108 may be configured to control the display screen 106 to display the plurality of activity categories. The control circuitry 108 may be further configured to determine a plurality of activity categories associated with the plurality of activities 308A to 308D based on the identification information (ID) of the corresponding activity.

In accordance with an embodiment, before the display of the plurality of image frames of the plurality of activities 308A to 308D on the display screen 106 (as described in FIG. 3), the control circuitry 108 may control the display screen 106 to display the determined plurality of activity categories of the plurality of activities 308A to 308D. The determined plurality of activity categories may indicate different categories or types of activities or event presently available or being performed near the first vehicle 102 in which the first occupant 310 (i.e. disabled person) may be travelling. As shown in FIG. 4A, the display screen 106 may display a plurality of user interface (UI) elements 404A to 404F (for example a touch button), where each UI element may correspond to one category of the determined plurality of activity categories. For example, as shown in FIG. 4A, the plurality of UI elements 404A to 404F may include a first UI element 404A for "Music" activity category, a second UI element 404B for "Dance" activity category, a third UI element 404C for "Sports" activity category, a fourth UI element 404D for "Meeting" activity category, a fifth UI element 404E for "Talk Show" activity category, and a sixth UI element 404F for "Show All" activity category.

In accordance with an embodiment, the control circuitry 108 may be configured to receive an input, from the first occupant 310 of the first vehicle 102, corresponding to at least one of the plurality of UI elements 404A to 404F displayed on the display screen 106. The input may be provided via one of the plurality of UI elements 404A to 404F, the I/O device 204 of the display apparatus 104 or from a remote-control device (not shown) communicably coupled with the display apparatus 104. The received input from the first occupant 310 may indicate a selection of an activity category from the plurality of activity categories displayed, for example, in FIG. 4A. Further, the control circuitry 108 may be configured to control the display screen 106 to display the information (i.e. plurality of image frames) of the corresponding activities (i.e. being performed at nearby physical spaces) based on the activity category selected from the plurality of activity categories. For example, the first occupant 310 may select or press the first UI element 404A to provide the input and select the "Music" category. Based on the selection of the first UI element 404A, the control circuitry 108 may detect all the physical spaces from the first set of physical spaces 304A to 304D in which the corresponding activity corresponds to the "Music category." In some embodiments, the control circuitry 108 may filter or select (i.e. from the plurality of activity categories), the received information (i.e. the plurality of image frames) of those activities for which the identification information (ID) corresponds to the "Music" category. Thus, based on the input provided by the first occupant 310, the disclosed display apparatus 104 may search and display the activities at nearby physical spaces which may correspond to a particular activity category. Therefore, the disclosed display apparatus 104 may provide real-time assistance to the first occupant 310 (i.e. disabled person) to search and view the activities based on his/her interests and passion.

In an embodiment, the control circuitry 108 may receive the input, via the selection of the sixth UI element 404F, to select all categories of activities being performed at the first set of physical spaces 304A to 304D present within the specific area range 302. Based on receipt of such input (with respect to "Show All"), the control circuitry 108 may control the display screen 106 to display all the plurality of activities 308A to 308D (i.e. available at the first set of physical spaces 304A to 304D) of all the plurality of activity categories as shown in FIG. 4A, for example, in a grid pattern.

In accordance with an embodiment, the control circuitry 108 may be configured to receive a user input from the first occupant 310, where the user input may indicate a selection of an activity of the plurality of activities 308A to 308D being displayed on the display screen 106 (shown in FIG. 4A). Based on the received user input, the control circuitry 108 may control the display screen 106 to display the plurality of images frames of the selected activity. For example, in case, the first occupant 310 wants to only view or interested in the third activity 308C (i.e. Talk show) currently performed at the third physical space 304C, the user input may provide selection of at least one the plurality of image frames of the third activity 308C from the displayed image frame of the plurality of activities 308A to 308D. Therefore, in such case, the display screen 106 may completely (say in a full-screen mode) display the image frames of the selected activity (i.e. third activity 308C), i.e. "Talk Show" as shown in FIG. 4A.

In accordance with an embodiment, the control circuitry 108 may be further configured to control the audio rendering device 206 of the display apparatus 104 to playback the plurality of audio frames associated with the third activity 308C. In an embodiment, the plurality of audio frames may be received from the corresponding second electronic device (i.e. of the third activity 308C) based on the established communication session (i.e. first communication connection) with the second electronic device associated with the third physical space 304C. Thus, the first occupant 310 (i.e. disabled occupant) may view the activity-of-interest (for example the third activity 308C) while travelling in the first vehicle 102 or may select the activity-of-interest from the plurality of activities 308A to 308D, without manually visiting each of the first set of physical spaces 304A to 304D one-by-one. In case, the first occupant 310 likes the activity (or plurality of image/audio frames) rendered via the display screen 106 or the audio rendering device 206, the first occupant 310 may physically drive the first vehicle 102 to the corresponding physical space (for example the third physical space 304C in case the third activity 308C is liked by the first occupant 310), and easily explore his/her passion by physically viewing the third activity 308C along with other people (i.e. audience) present in the visited physical space (for example the third physical space 304C) and further enhance his/her social interactions.

In accordance with an embodiment, the control circuitry 108 may be configured to control the display screen 106 to display a user interface 406 (as "Show Map" shown in FIG. 4A) with the display of the selected activity. The first occupant 310 may select, via the I/O device 204, the UI 406 to determine a route to physically reach the physical space of the displayed activity. For example, as shown in FIG. 4A, the first occupant 310 may select the UI 406 to receive route information (for example route map) to reach the third physical space 304C to physically view the third activity (for example "Talk Show").

In accordance with an embodiment, based on the selection of the UI 406, the control circuitry 108 may be further configured to acquire information of the geographical location of the corresponding physical space (for example the third physical space 304C) where the selected single activity is being performed. The control circuitry 108 may be configured to receive the information of the geographical location of the corresponding physical space from the associated electronic device (for example a third electronic device 306C of the third physical space 304C) In some embodiments, the control circuitry 108 may be configured to receive the information of the geographical location of the corresponding physical space from the server 114.

Figure 4B:
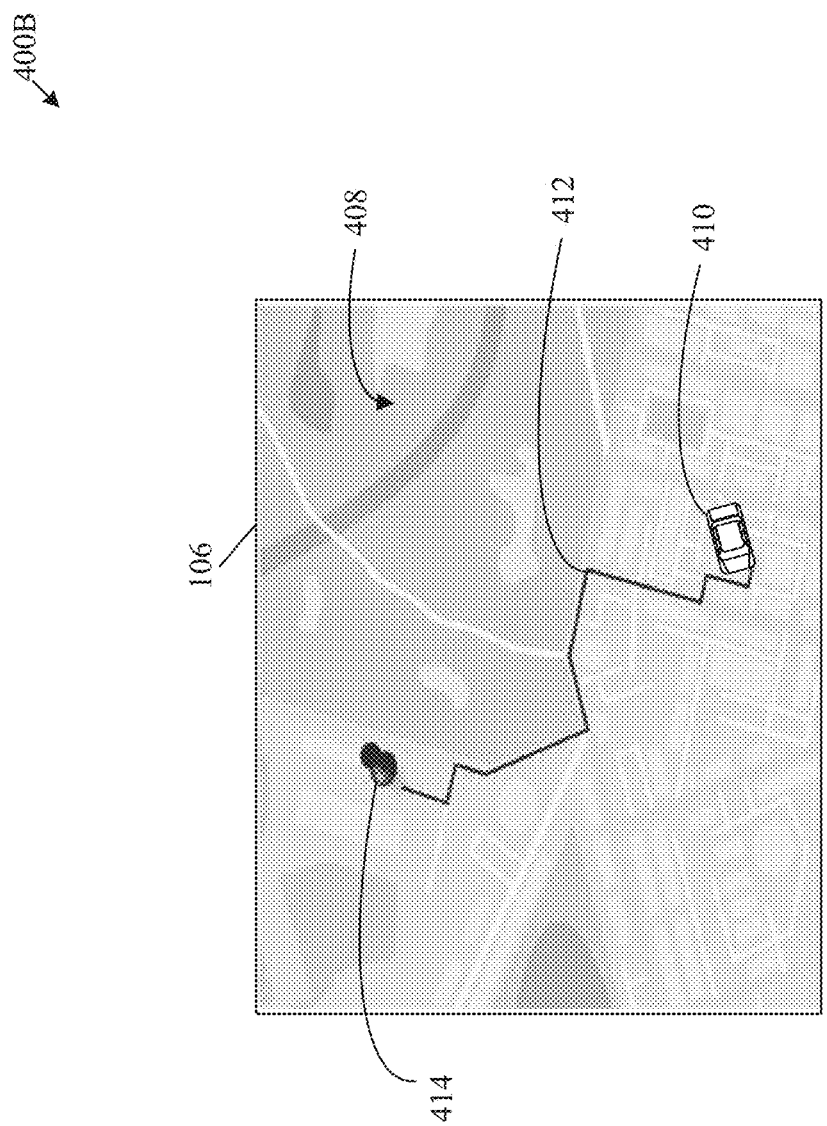
FIG. 4B illustrates an exemplary scenario to display route information, in accordance with an embodiment of the disclosure.

In accordance with an embodiment, the control circuitry 108 may be further configured to determine the geographical location information (i.e. current location) of the first vehicle 102. The control circuitry 108 may further determine the route (for example shortest route) to reach the corresponding physical space (for example the third physical space 304C) of the selected activity (for example the third activity 308C) based on the geographical location of the corresponding physical space where the selected activity is being performed and the geographical location of the first vehicle 102. The control circuitry 108 may be further configured to control the display screen 106 to display route information 412 (i.e. determined route) between the geographical location of the physical space of the selected activity and the geographical location of the first vehicle 102 as shown in FIG. 4B. In some embodiments, the control circuitry 108 may control the display screen 106 to display a map 408, an image 410 of the first vehicle 102 on the map 408, and the route information 412 on the map 408, in accordance with the geographical location of the first vehicle 102 as shown in FIG. 4B. The image 410 of the first vehicle 102 may indicate the current location of the first vehicle 102. In an embodiment, the control circuitry 108 may be configured to control the display screen to display a destination point 414 (shown in FIG. 4B) that may indicate the geographical location of the physical space (for example the third physical space 304C) of the selected activity (for example the "Talk Show"). The control circuitry 108 may be further configured update the route information 412 based on the change in the geographical location (i.e. current location) of the first vehicle 102 during the movement of the first vehicle towards the physical space of the selected activity. In accordance with an embodiment, the control circuitry 108 may be configured to display the route information 412 based on a parking space of the physical space (for example the third physical space 304C) of the selected activity in order to park the first vehicle 102. Thus, the disclosed display apparatus 104 may facilitate the first occupant 310 with the route information 412, in order to help the first occupant 310 (i.e. disabled person) of the first vehicle 102 to reach at desired location easily.

In accordance with an embodiment, the control circuitry 108 may be configured to receive information about physical condition of the physical space (for example the third physical space 304C) of the selected activity (for example the third activity 308C). The information about the physical condition may include accessibility information about the selected physical space. The accessibility information may include, but is not limited to, a building floor map, availability of wheelchairs, locations of elevators and slopes, location of fire exits, available parking zones, or emergency contact details. In some embodiments, the accessibility information may include accommodation information which may indicate information about one or more accommodations (like rooms) available in the physical space. The control circuitry 108 may receive the accessibility information from the electronic device (for example the third electronic device 306C) or a server associated with the physical space (for example the third physical space 304C). In some embodiments, the control circuitry 108 may receive the accessibility information from the server 114. In another embodiment, the accessibility information may be sourced from, but is not limited to, an owner of the physical space, an activity promoter, an event handler, other attendees, or past attendees of the selected activity. The control circuitry 108 may be further configured to control the display screen 106 to display the accessibility information such that the first occupant 310 may be completely aware and confident about the physical space to be visited. The control circuitry 108 may be further configured to execute various operations associated with parking of the first vehicle 102 in one of the first set of physical spaces 304A to 304D. Details of such operations may be described, for example, in FIG. 5.

Figure 5:
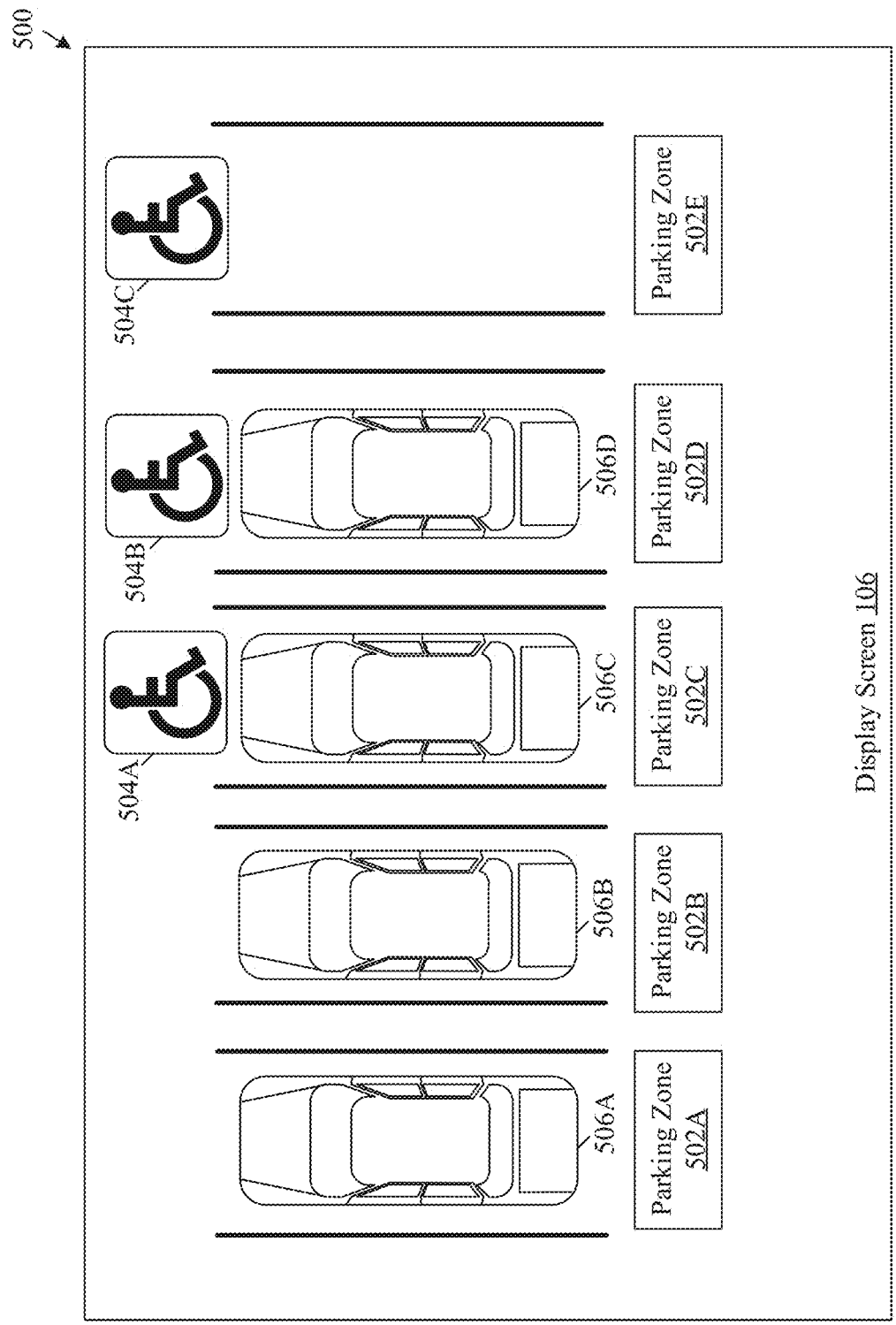
FIG. 5 illustrates an exemplary scenario to provide parking information of physical space of a selected activity, in accordance with an embodiment of the disclosure.

FIG. 5 illustrates an exemplary scenario to provide parking information of physical space of selected activity, in accordance with an embodiment of the disclosure. FIG. 5 is explained in conjunction with FIGS. 1, 2, 3, 4A, and 4B. With reference to FIG. 5, there is shown a scenario 500 that includes the display screen 106 of the disclosed display apparatus 104. The display screen 106 may display a plurality of parking zones (such as plurality of parking zones 502A to 502E). For an example, the plurality of parking zones 502A to 502E may be situated at the physical space of the nearby activity selected by the first occupant 310 as described, for example, in FIG. 4A. In FIG. 5, there is further shown a plurality of signs 504A to 504C corresponding to a set of parking zones 502C to 502E of the plurality of parking zones 502A to 502E. The plurality of signs 504A to 504C may indicate that the set of parking zones 502C to 502E are pre-allocated or pre-assigned to disabled or handicapped drivers. In FIG. 5, for example, there is further shown a plurality of second vehicles 506A to 506D parked in another set of parking zones 502A to 502D.

In accordance with an embodiment, the control circuitry 108 may be configured to receive parking information of the plurality of parking zones 502A to 502E which may be associated with a parking space of the one of the first set of physical spaces 304A to 304D associated with the selected activity. In an embodiment, the control circuitry 108 may be configured to receive the parking information from the corresponding electronic device (for example the third electronic device 306C) associated with the selected physical space (for example the third physical space 304C). In some embodiments, the parking information of the selected physical space may be received from the server 114. The parking information may indicate availability information of the plurality of parking zones 502A to 502E in the selected physical space in which the selected activity (i.e. liked by the first occupant 310) is being performed. The availability information may indicate one or more available parking zones (for example a parking zone 502E shown in FIG. 5) or one or more unavailable parking zones (for example a set of parking zones 502A to 502D shown in FIG. 5) of the physical space to be visited. It should be noted that the plurality of parking zones 502A to 502E shown in FIG. 5 is presented merely as an example. The plurality of physical spaces 304A to 304G may include other types of parking zones, without deviation from the scope of the disclosure.

The control circuitry 108 may be configured to control the display screen 106 to display the parking information or the availability information for the first occupant 310 (say before reaching the corresponding physical space). The control circuitry 108 may be further configured to receive (i.e. via the I/O device 204 from the first occupant 310) a user input associated with selection of one available parking zone mentioned by the availability information. The control circuitry 108 may be further configured to transmit the selection of the one available parking zone to the corresponding electronic apparatus associated with the selected physical space. For example, the control circuitry 108 may transmit the selection of the parking zone 502E (indicated by the availability information) to the third electronic device 306C of the third physical space 304C of the third activity 308C (i.e. Talk Show") which is selected by the first occupant 310 (i.e. disabled person). The selection of the parking zone 502E may allow the first occupant 310 to park the first vehicle 102 in the parking zone 502E (for example).

In some embodiments, the control circuitry 108 may receive parking route information from the corresponding electronic device based on the transmission of the selection of the one available parking zone. The parking route information may indicate a route to reach the selected one available parking zone from the geographical location (i.e. current location) of the first vehicle 102. The control circuitry 108 may be further configured to control the display screen 106 to display the received parking route information in order to assist the first occupant 310 (i.e. disabled person) to easily reach the selected one available parking zone of the physical space.

In accordance with an embodiment, the parking information may also include vehicle information. The vehicle information may indicate information about a plurality of second vehicles 506A to 506D parked within the set of parking zones 502A to 502D (i.e. unavailable parking zones). Further, the vehicle information may indicate driver profile information associated with a plurality of occupants (i.e. different from the first occupant 310) of the plurality of second vehicles 506A to 506D. The driver profile information may include, but is not limited to, a name, an age, a health condition (i.e. disabled person or able-bodied person), contact details, and the like. The vehicle information may also indicate registration information (i.e. vehicle registration number) of the corresponding vehicle parked within the set of parking zones 502A to 502D (i.e. unavailable parking zones). In accordance with an embodiment, the control circuitry 108 of the display apparatus 104 may be configured to extract the vehicle information from the received parking information in order to determine the driver profile information associated with the plurality of occupants of the plurality of second vehicles 506A to 506D already parked within the set of parking zones 502A to 502D (i.e. unavailable parking zones).

In some embodiments, the parking information may include parking indicators which may indicate information about the plurality of signs 504A to 504C associated with parking zones 506C to 502E (for example). The parking indicators may indicate that the parking zones 506C to 502E have been pre-allocated to disabled drivers or occupants. The control circuitry 108 may be further configured to determine whether one or more of the plurality of second vehicles 506A to 506D are associated with able-bodied driver but parked in one of the parking zones 506C to 502E (pre-allocated to disabled driver) based on the vehicle information indicating the driver profile information and based on the parking indicators (i.e. information about the plurality of signs 504A to 504C) included in the parking information received from the selected physical space (for example the third physical space 304C).

For example, an occupant or driver of a vehicle 506D of the plurality of second vehicles 506A to 506D is an able-bodied person who may have intentionally or unintentionally parked his/her vehicle 506D in a parking zone 502D, where the parking zone 502D is pre-allocated for disabled or handicapped persons. In such a case, the control circuitry 108 may be configured to determine that the occupant or driver of the vehicle 506D is the able-bodied person who has parked the vehicle 506D in the parking zone 502D (i.e. pre-allocated for disabled people) based on the driver profile information and the parking indicators included in the received parking information. The control circuitry 108 may be further configured to establish a second communication connection (for example a vehicle-to-vehicle communication connection) with one or more electronic control device (ECD) of the corresponding vehicle (for example the vehicle 506D) parked in the parking zone 502D (i.e. pre-allocated for disabled people). In some embodiments, the control circuitry 108 may be configured to establish the second communication connection (for example vehicle-to-device connection) with a user device (for example, but not limited to, a mobile phone or a personal computer) associated with the occupant or driver (i.e. able-bodied person) of the vehicle (for example the vehicle 506D of the plurality of second vehicles 506A to 506D).

The control circuitry 108 of the disclosed display apparatus 104 may establish the second communication channel, for example, to communicate with the occupant or driver (i.e. able-bodied person) of the vehicle 506D to vacate the parking zone 502D which is pre-allocated for disabled people. Further, based on the determination based on the driver profile information and the parking indicators, the control circuitry 108 may be configured to transmit message information (for example a message, SMS, or an email) to the one or more electronic control device (ECD) associated with the vehicle 506D or to the user device of the occupant of the vehicle 506D based on the establish second communication channel, in order to vacate the parking zone 502D for the first vehicle 102 of the first occupant 310 (i.e. disabled person). The message information may a request for the able-bodied person to vacate the parking zone allocated for the disable person. In some embodiments, the control circuitry 108 may transmit the message information to the corresponding electronic device (for example the third electronic device 306C) to further communicate to a parking authorities of the corresponding physical space (i.e. the third physical space 304C) of the selected activity (for example "Talk Show"), such that the parking authorities may request the able-bodied driver to vacate the parking zone pre-allocated to the disabled people (such as the first occupant 310). In some embodiments, the message information may be transmitted for multiple vehicles (for example to vehicle 502C and the vehicle 502D) which may be driven by able-bodied people, but parked in the parking zones pre-allocated to the disabled persons, as shown in FIG. 5.

In case, the set of parking zones 502C to 502E for the disabled occupants are full, the control circuitry 108 may be further configured to determine a nearest available parking zone associated with the able-bodied people. Accordingly, the control circuitry 108 may be configured to control the display screen 106 to display the nearest available parking zone and the corresponding parking route information (i.e. to reach the nearest available parking zone) to the first occupant 310 of the first vehicle 102. Thus, the disclosed display apparatus 104 may provide real-time assistance to the first occupant 310 (i.e. disable person) to easily find the parking zone in the physical space of the selected activity. The disclosed display apparatus 104 may provide convenience to the first occupant 310 of the first vehicle 102 who is one of an able-bodied person or a disabled person, in order to easily park the first vehicle 102 in the selected physical space and explore the activity-of-interest as per his/her passion.

Figure 6:
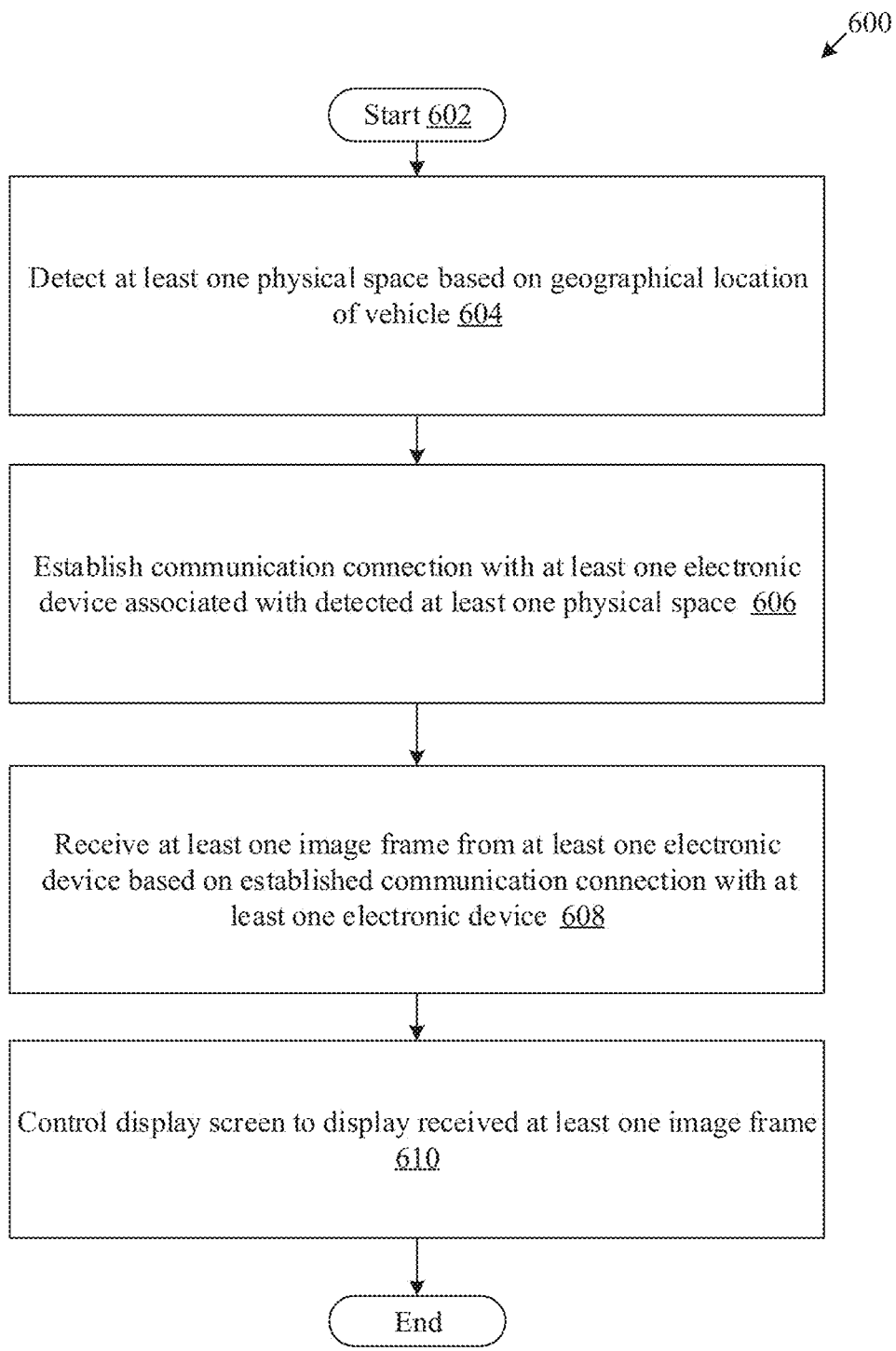
FIG. 6 illustrates a flowchart of an exemplary method for display control based on the location of the vehicle, in accordance with an embodiment of the disclosure.

FIG. 6 illustrates a flowchart of an exemplary method for display control based on the location of the vehicle, in accordance with an embodiment of the disclosure. FIG. 6 is explained in conjunction with elements from FIGS. 1, 2, 3, 4A, 4B, and 5. With reference to FIG. 6, there is shown a flowchart 600 that depicts a method for display control based on a location of the first vehicle 102. Any display apparatus, for example, a display apparatus 104 which may include the display screen 106 and the control circuitry 108 that may be communicatively coupled to the display screen 106, may execute operations specified in the method. The method illustrated in the flowchart 600 may start from 602.

At 604, at least one physical space may be detected based on the geographical location of the first vehicle 102. The control circuitry 108 may be configured to detect at least one physical space from the plurality of physical spaces 110A to 110N based on the geographical location (i.e. current location) of the first vehicle 102. The detection of the at least one physical space is described, for example, in FIGS. 1 and 3.

At 606, a communication connection may be established with at least one electronic device associated with the detected at least one physical space. The control circuitry 108 may be configured to establish the communication connection (for example the first communication connection) with at least one electronic device (for example the first electronic device 112A) of the plurality of electronic devices 112A to 112N which may be associated with the at least one physical space of the plurality of physical spaces 110A to 110N. The establishment of the communication connection with the at least one electronic device is described, for example, in FIG. 3.

At 608, at least one image frame may be received from the at least one electronic device based on the established communication connection with the at least one electronic device. The control circuitry 108 may be configured to receive the at least one image frame from the at least one electronic device (for example the first electronic device 112A) based on the established communication connection (for example the first communication connection) with the at least first electronic device. The at least one image frame may be associated with at least one activity being performed within the at least one physical space (for example the first physical space 110A). In some embodiments, the control circuitry 108 may receive the audio frame associated with the activity being performed within the at least one physical space. The reception of the at least one image frame and/or audio frame is described, for example, in FIG. 3.

At 610, the display screen 106 may be controlled to display the received at least one image frame. The control circuitry 108 may be configured to control the display screen 106 to display the received at least one image frame that may be associated with the at least one activity (for example the first activity 308A) being performed in the at least one physical space (for example the first physical space 304A). The displayed image frame associated with the at least one activity is described, for example, in FIGS. 3 and 4A.

The flowchart 600 is illustrated as discrete operations, such as 604, 606, 608, and 610. However, in certain embodiments, such discrete operations may be further divided into additional operations, combined into fewer operations, or eliminated, depending on the particular implementation without any deviation from the scope of the disclosure.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A display apparatus, comprising:
    a display screen; and
    control circuitry coupled with the display screen, wherein the control circuitry is configured to:
        detect at least one physical space based on a geographical location of a first vehicle which includes the display apparatus, wherein an occupant associated with the first vehicle is a disabled person;
        establish a first communication connection with at least one first electronic device associated with the detected at least one physical space;
        receive at least one image frame, associated with at least one activity being performed within the at least one physical space, based on the established first communication connection with the at least one first electronic device, wherein the at least one image frame is received from the at least one first electronic device;
        receive parking information of a plurality of parking zones, associated with the at least one physical space, from the at least one first electronic device, wherein the parking information indicates a second vehicle parked at a parking zone of the plurality of parking zones, and the second vehicle is associated with an able-bodied person;
        transmit message information to the at least one first electronic device associated with the detected at least one physical space, to vacate the parking zone from the second vehicle; and
        control the display screen to display the received at least one image frame associated with the at least one activity and the received parking information.

2. The display apparatus according to claim 1, wherein the control circuitry is further configured to detect the at least one physical space present within a specific distance range from the first vehicle based on the geographical location of the first vehicle.

3. The display apparatus according to claim 1, wherein the at least one first electronic device comprises one of: at least one image capturing apparatus which captures the at least one image frame associated with the at least one activity, or a server which stores the at least one image frame associated with the at least one activity.

4. The display apparatus according to claim 1, further comprising:
an audio rendering device coupled with the control circuitry, wherein the control circuitry is further configured to:
receive at least one audio frame, associated with the at least one activity being performed within the at least one physical space, based on the established first communication connection with at least one second electronic device that is associated with the at least one first electronic device, wherein the at least one second electronic device comprises an audio capturing device which captures the at least one audio frame; and
control the audio rendering device to playback the received at least one audio frame associated with the at least one activity.

5. The display apparatus according to claim 1, wherein the control circuitry is further configured to control the display screen to display route information between the geographical location of the first vehicle and a geographical location of the at least one physical space.

6. The display apparatus according to claim 1, wherein the parking information includes availability information of at least one available parking zone of the plurality of parking zones, and wherein the control circuitry is further configured to:
control the display screen to display the availability information of the at least one available parking zone;
transmit a selection of one available parking zone from the at least one available parking zone to the at least one first electronic device associated with the detected at least one physical space;
receive parking route information from the at least one first electronic device based on the transmission, wherein the parking route information indicates a route to reach the at least one available parking zone; and
control the display screen to display the received parking route information to reach the at least one available parking zone.

7. The display apparatus according to claim 1, control circuitry is further configured to:
extract vehicle information included in the received parking information, wherein the vehicle information indicates information about the second vehicle and indicates driver profile information associated with one or more occupants of the second vehicle;
establish a second communication connection with an electronic control device associated with the second vehicle or with one or more user devices of the one or more occupants of the second vehicle; and
transmit the message information to the electronic control device or to the one or more user devices based on the established second communication connection and the driver profile information.

8. The display apparatus according to claim 7, wherein the first communication connection comprises a Vehicle-to-everything (V2X) communication connection and the second communication connection comprises at least one of: a Vehicle-to-everything (V2X) communication connection or a vehicle-to-vehicle (V2V) communication connection.

9. The display apparatus according to claim 1, wherein the circuitry is further configured to:
receive accessibility information about the at least one physical space from the at least one first electronic device, wherein the accessibility information comprises information about availability of wheelchairs in the at least one physical space; and
control the display screen to display the received accessibility information about the at least one physical space.

10. The display apparatus according to claim 1, wherein the parking information includes information about a plurality of signs each associated with one of the plurality of parking zones, and wherein each of the plurality of signs indicate that the corresponding parking zone is allocated to the disabled person or the able-bodied person.

11. The display apparatus according to claim 1, wherein the circuitry is further configured to transmit the message information to the at least one first electronic device based on a determination that the parking zone, parked with the second vehicle, correspond to a sign which indicates that the parking zone is allocated to the disabled person.

12. A display apparatus, comprising:
a display screen; and
control circuitry coupled with the display screen, wherein the control circuitry is configured to:
detect a plurality of physical spaces based on a geographical location of a first vehicle which includes the display apparatus, wherein an occupant associated with the first vehicle is a disabled person;
establish a first communication connection with a plurality of electronic devices associated with the detected plurality of physical spaces;
receive a plurality of images frames, associated with a plurality of activities being performed within the plurality of physical spaces, based on the established first communication connection with the plurality of electronic devices;
control the display screen to display at least one image frame from the received plurality of image frames based on a selection of an activity category from a plurality of activity categories associated with the plurality of activities;
receive parking information of a plurality of parking zones, associated with a physical space of the detected plurality of physical spaces, from at least one first electronic device of the plurality of electronic devices, wherein the parking information indicates a second vehicle parked at a parking zone of the plurality of parking zones, and the second vehicle is associated with an able-bodied person;
transmit message information to the at least one first electronic device associated with the physical space, to vacate the parking zone from the second vehicle; and
control the display screen to display the received parking information.

13. The display apparatus according to claim 12, wherein the circuitry is further configured to:
control the display screen to display the plurality of activity categories associated with the plurality of activities being performed within the plurality of physical spaces;
receive an input from an occupant of the first vehicle to select the activity category from the displayed plurality of activity categories; and
select the at least one image frame from the received plurality of image frames based on the received input, wherein the selected at least one image frame is associated an activity being performed within the physical space of the detected plurality of physical spaces.

14. The display apparatus according to claim 12, wherein the plurality of activity categories comprise at least one of: a music category, a movie category, a dance category, a training category, a painting category, a seminar category, a sports category, a talk show category, or a meeting category.

15. The display apparatus according to claim 12, wherein the control circuitry is further configured to detect the plurality of physical spaces present within a specific distance range from the first vehicle based on the geographical location of the first vehicle.

16. The display apparatus according to claim 12, wherein the plurality of electronic devices comprise one of: at least one image capturing apparatus which captures the corresponding image frame of the plurality of images frames associated with the plurality of activities, or a server which stores the plurality of images frames associated with the plurality of activities.

17. The display apparatus according to claim 12, wherein the control circuitry is further configured to control the display screen to display route information between the geographical location of the first vehicle and a geographical location of the physical space selected from the plurality of physical spaces.

18. A method, comprising:
in a display apparatus which includes a display screen:
  detecting at least one physical space based on a geographical location of a first vehicle which includes the display apparatus, wherein an occupant associated with the first vehicle is a disabled person;
  establishing a first communication connection with at least one first electronic device associated with the detected at least one physical space;
  receiving at least one image frame, associated with at least one activity being performed within the at least one physical space, based on the established first communication connection with the at least one first electronic device, wherein the at least one image frame is received from the at least one first electronic device;
  receiving parking information of a plurality of parking zones, associated with the at least one physical space, from the at least one first electronic device, wherein the parking information indicates a second vehicle parked at a parking zone of the plurality of parking zones, and the second vehicle is associated with an able-bodied person;
  transmitting message information to the at least one first electronic device associated with the detected at least one physical space, to vacate the parking zone from the second vehicle; and
  controlling the display screen to display the received at least one image frame associated with the at least one activity and the received parking information.

19. The method according to claim 18, further comprising detecting the at least one physical space present within a specific distance range from the first vehicle based on the geographical location of the first vehicle.

20. The method according to claim 18, further comprising controlling the display screen to display route information between the geographical location of the first vehicle and a geographical location of the at least one physical space.

21. The method according to claim 18, further comprising:
  establishing a second communication connection with an electronic control device associated with the second vehicle or with one or more user devices of one or more occupants of the second vehicle; and
  transmitting the message information to the electronic control device, associated with the second vehicle or to the one or more user devices of the one or more occupants of the second vehicle, based on the established second communication connection,
  wherein the parking information indicates driver profile information of the occupant of the second vehicle.

* * * * *